(12) United States Patent
Nishiumi et al.

(10) Patent No.: US 10,919,576 B2
(45) Date of Patent: Feb. 16, 2021

(54) VEHICLE

(71) Applicant: TOYOTA JIDOSHA KABUSHIKI KAISHA, Toyota (JP)

(72) Inventors: Hiroaki Nishiumi, Toyota (JP); Yugo Ichida, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/949,442

(22) Filed: Apr. 10, 2018

(65) Prior Publication Data

US 2018/0304929 A1 Oct. 25, 2018

(30) Foreign Application Priority Data

Apr. 21, 2017 (JP) .............................. JP2017-084237

(51) Int. Cl.
*H01M 8/2465* (2016.01)
*B62D 21/15* (2006.01)
*B60L 50/71* (2019.01)
*B60K 1/00* (2006.01)
*B62D 21/11* (2006.01)

(52) U.S. Cl.
CPC .............. *B62D 21/152* (2013.01); *B60K 1/00* (2013.01); *B60L 50/71* (2019.02); *B62D 21/11* (2013.01); *H01M 8/2465* (2013.01); *B60Y 2306/01* (2013.01); *B60Y 2400/202* (2013.01); *H01M 2250/20* (2013.01); *Y02T 90/40* (2013.01)

(58) Field of Classification Search
CPC ....... B60K 1/00; B60L 50/71; B60Y 2306/01; B60Y 2400/202; B62D 21/11; B62D 21/152; H01M 2250/20; H01M 8/2465
See application file for complete search history.

(56) References Cited

U.S. PATENT DOCUMENTS

| | | | |
|---|---|---|---|
| 2005/0277012 A1* | 12/2005 | Inagaki ................. | H01M 8/247 429/470 |
| 2014/0110185 A1* | 4/2014 | Naito ..................... | B60L 3/0007 180/65.31 |
| 2014/0367182 A1 | 12/2014 | Yoshinaga et al. | |
| 2015/0027796 A1 | 1/2015 | Naito et al. | |
| 2015/0105982 A1* | 4/2015 | Okamura ............ | B60R 21/0132 701/45 |
| 2017/0096172 A1 | 4/2017 | Nagaosa | |
| 2017/0101031 A1 | 4/2017 | Ohashi | |

FOREIGN PATENT DOCUMENTS

| | | | | |
|---|---|---|---|---|
| JP | 08192639 A | * | 7/1996 | .......... H01M 2/1083 |
| JP | 2004247139 A | | 9/2004 | |
| JP | 2014113910 A | | 6/2014 | |
| JP | 2015-231319 A | | 12/2015 | |
| JP | 2017074819 A | | 4/2017 | |
| WO | 2013/111669 A1 | | 1/2013 | |
| WO | 2013/118602 A1 | | 1/2013 | |

OTHER PUBLICATIONS

Machine Translation JPH08192639A (Year: 1996).*

* cited by examiner

*Primary Examiner* — Victoria H Lynch
(74) *Attorney, Agent, or Firm* — Dickinson Wright PLLC

(57) ABSTRACT

A vehicle includes: a front room disposed at a front portion of the vehicle in the vehicle in a vehicle-longitudinal direction; a fuel cell stack disposed in the front room, the fuel cell stack including multiple cells stacked in the vehicle-longitudinal direction; and a buffer member disposed in front of the fuel cell stack in the vehicle-longitudinal direction.

12 Claims, 5 Drawing Sheets

FIG. 2
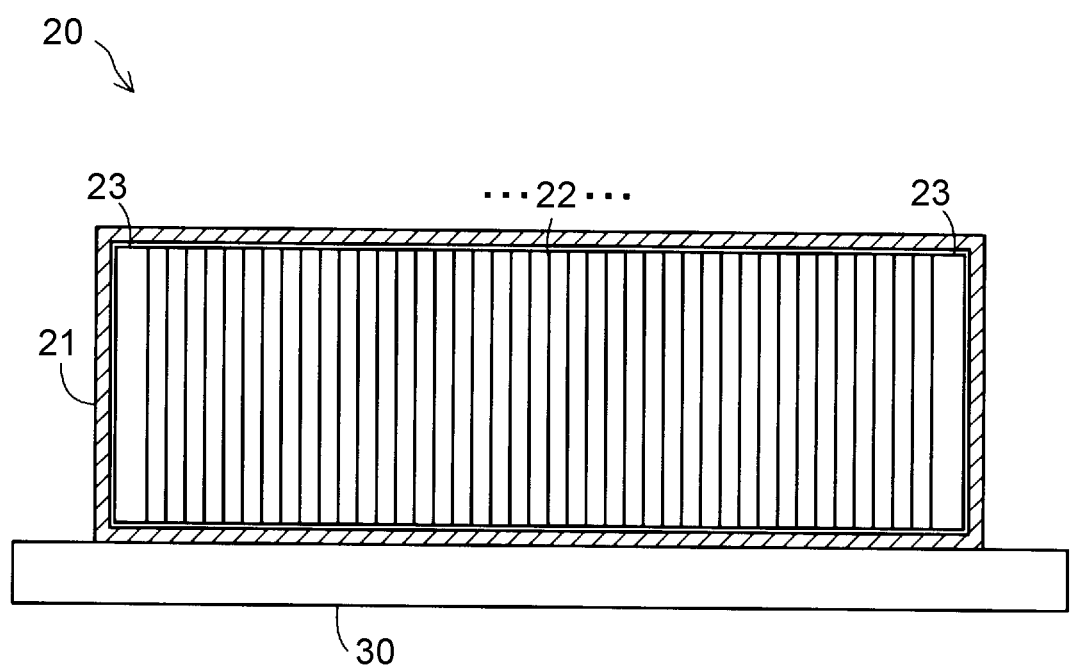
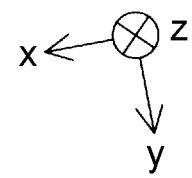

INERTIA FORCE DIRECTION

VEHICLE

INCORPORATION BY REFERENCE

The disclosure of Japanese Patent Application No. 2017-084237 filed on Apr. 21, 2017 including the specification, drawings and abstract is incorporated herein by reference in its entirety.

BACKGROUND

1. Technical Field

The present disclosure relates to a vehicle.

2. Description of Related Art

There are vehicles in which fuel cell stacks that are stacked bodies of fuel cells are installed. A fuel cell stack is disposed in a front room located at a vehicle-front portion in a state in which cells are stacked in the vehicle-longitudinal direction, as described in Japanese Patent Application Publication No. 2015-231319, for example.

SUMMARY

At the time of a collision in the frontward direction of a vehicle (hereinafter, a collision in the frontward direction of a vehicle is referred to as a "front collision"), if variation in tightness-looseness is caused in a stacking condition of respective cells composing a fuel cell stack due to an inertia force generated in the stacking direction of the fuel cell stack, a fastening load of the fuel cells becomes smaller at a position where the stacking condition is looser.

The present disclosure provides a technique to suppress variation in tightness-looseness from being caused in the stacking condition of a fuel cell stack.

A vehicle according to an aspect of the present disclosure includes: a front room disposed at a front portion of the vehicle in the vehicle in a vehicle-longitudinal direction; a fuel cell stack disposed in the front room, the fuel cell stack including multiple cells stacked in the vehicle-longitudinal direction; and a buffer member disposed in front of the fuel cell stack in the vehicle-longitudinal direction.

According to the aspect, even when the vehicle experiences a front collision, it is possible to reduce an inertia force applied in the stacking direction of the fuel cell stack, thus suppressing variation in tightness-looseness from being caused in the stacking condition of the fuel cell stack. Accordingly, it is possible to suppress generation of parts having smaller fastening loads in the fuel cells.

In the aspect, the buffer member may be configured to reduce an input load into the fuel cell stack at a front collision time of the vehicle at a predetermined rating speed to be smaller than a durable load of the fuel cell stack at the front collision time of the vehicle at the rating speed.

According to the above configuration, at the front collision time, the input load into the fuel cell stack, which is reduced by the buffer member, is defined to be smaller than a durable load of the fuel cell stack; therefore, it is possible to suppress variation in tightness-looseness from being caused in the stacking condition of the fuel cell stack. Accordingly, it is possible to suppress generation of parts having smaller fastening loads in the fuel cells.

In the aspect, the rating speed may be 56 km/h.

According to the above configuration, it is possible to suppress variation in tightness-looseness from being caused in the stacking condition of the fuel cell stack. Accordingly, it is possible to suppress generation of parts having smaller fastening loads in the fuel cells.

In the aspect, the fuel cell stack may include a stack frame supporting the fuel cell stack from a bottom of the fuel cell stack, and the buffer member may be fixed to the stack frame.

According to the above configuration, since an impact at the front collision time is applied to the stack frame, it is possible to suppress the impact from being directly applied to the fuel cell stack. Hence, it is possible to suppress variation in tightness-looseness from being caused in the stacking condition of the fuel cell stack. Accordingly, it is possible to suppress generation of parts having smaller fastening loads in the fuel cells.

In the aspect, the vehicle may further include a mount fixing the stack frame to the vehicle.

According to the above configuration, since it is possible to release the impact applied to the stack frame toward the mounts, the impact at the front collision time can be dispersed. Accordingly, it is possible to further suppress the impact from being applied to the fuel cell stack. Hence, it is possible to suppress variation in tightness-looseness from being caused in the stacking condition of the fuel cell stack. Accordingly, it is possible to suppress generation of parts having smaller fastening loads in the fuel cells.

In the aspect, the vehicle may be a fuel cell vehicle.

The present disclosure can be embodied in various manners, and for example, can be embodied by a manufacturing method of a vehicle, an arrangement method of a fuel cell stack in a vehicle, and others.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a sectional view showing a schematic configuration of a fuel cell stack;

DETAILED DESCRIPTION OF EMBODIMENTS

A. Embodiment

Figure 1:
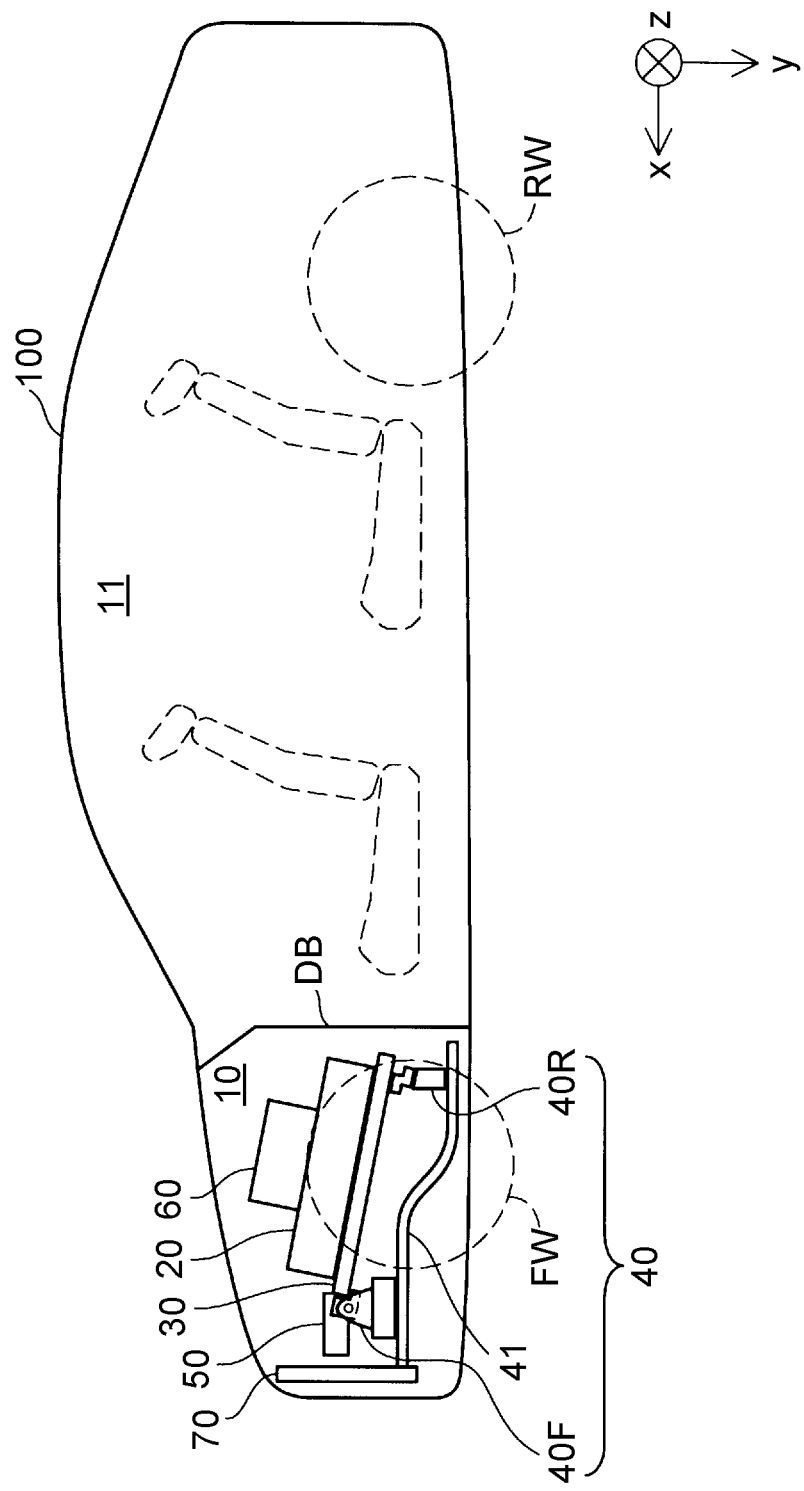
FIG. 1 is an explanatory view showing a schematic configuration of a vehicle.

FIG. 1 is an explanatory view showing a schematic configuration of a vehicle 100 in which a fuel cell battery according to one embodiment of the present disclosure is installed. The vehicle 100 includes a front room 10 and a vehicle cabin 11. In the present embodiment, the front room 10 is formed as a space located at a more frontward position (in a +x-axis direction) than the vehicle cabin 11 of the vehicle 100, the space including a region interposed between a pair of front wheels FW. The front room 10 and the vehicle cabin 11 are partitioned by a dash board DB. The vehicle 100 includes a fuel cell stack 20 described later as an electric power source, and a motor (not illustrated) as a motive power source drives to drive at least either of the front wheels FW and rear wheels RW. FIG. 1 shows an x-axis, a y-axis, and a z-axis that are orthogonal to one another. These axes correspond to respective axes shown in FIG. 2 and subsequent drawings.

The fuel cell stack 20 is disposed in the front room 10. The vehicle cabin 11 is formed at a vehicle-rearward position (in a −x-axis direction) in the front room 10. In the present embodiment, the vehicle cabin 11 is formed as a space located between the pair of front wheels FW and the pair of rear wheels RW and expanding in the vehicle-longitudinal direction (the x-axis direction). The fuel cell stack 20 is a proton-exchange membrane fuel cell, and generates electric power by receiving hydrogen gas supply from a hydrogen gas supply system (not illustrated), and air supply from an air supply system (not illustrated).

In the present embodiment, the fuel cell stack 20 is fixed to a suspension member 41 via a stack frame 30, and is disposed inside the front room 10. A fuel-cell power control unit 60 that converts DC electric power generated by the vehicle 100 into AC electric power is placed and fixed onto the fuel cell stack 20.

The stack frame 30 is a metallic member supporting the fuel cell stack 20 from a bottom thereof. The stack frame 30 is fixed to a suspension member 41 by mounts 40 provided respectively at a front end (in the +x-axis direction) and at a rear end (in the −x-axis direction) at a lower position (in a +y-axis direction). The mounts 40 includes a front mount 40F at the front end position of the stack frame 30, and a rear mount 40R at the rear end position of the stack frame 30. The mounts 40 suppress the fuel cell stack 20 from moving in the frontward direction at the time of a front collision of the vehicle 100. The suspension member 41 is a member composing a part of vehicle body frames of the vehicle 100, and in the present embodiment, the suspension member 41 is also used as a member supporting the fuel cell stack 20.

In the present embodiment, a buffer member 50 is disposed in front of the fuel cell stack 20 in the vehicle-longitudinal direction. In the present embodiment, the buffer member 50 is fixed to the front end of the stack frame 30. A radiator 70 is disposed at a frontward position in the vehicle 100, more specifically, in front of the buffer member 50. The radiator 70 cools a coolant sent from the fuel cell stack 20 via a coolant passage (not illustrated) by air sent from a fan motor (not illustrated) disposed in the vicinity of the radiator 70, and discharges heat of the coolant to the outside of the vehicle.

FIG. 2 is a sectional view showing a schematic configuration of the fuel cell stack 20. The fuel cell stack 20 includes a case 21. The fuel cell stack 20 includes multiple fuel cells 22 stacked in the vehicle-longitudinal direction (the x-axis direction). The "multiple fuel cells 22 stacked in the vehicle-longitudinal direction (the x-axis direction)" includes a meaning that the fuel cells 22 are stacked in a direction within an angle of ±30° relative to the longitudinal direction (the x-axis direction) of the vehicle 100.

A pair of end plates 23 is disposed at both ends in the stacking direction (the x-axis direction) of a stacked body of the multiple fuel cells 22 stacked in the case 21. Each of the end plates 23 is a plate-like member. In the present embodiment, the case 21 is formed by aluminum (Al). The case 21 may be formed by stainless steel (SUS), titanium (Ti), or an alloy of these metals. The case 21 is not limited to metal, but may also be formed by resin.

Figure 3:
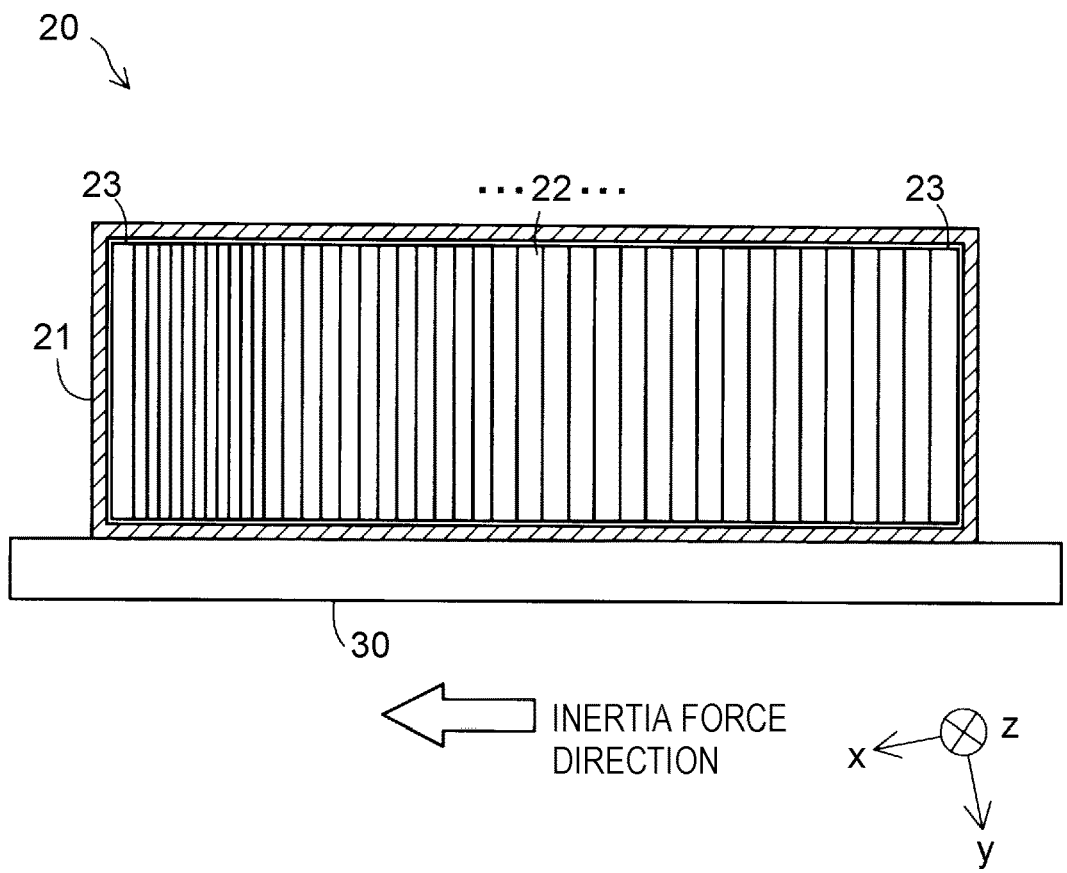
FIG. 3 is a reference drawing showing a section of the fuel cell stack.

FIG. 3 is a reference drawing of a sectional view of the fuel cell stack 20. FIG. 3 shows that an inertia force toward the vehicle-frontward side (in the +x-axis direction) from the vehicle-rearward side is caused to the fuel cell stack 20 due to a front collision of the vehicle 100. As shown in FIG. 3, in the fuel cell stack 20, variation in tightness-looseness is caused in the stacking condition of the fuel cells 22 when the inertia force in the stacking direction of the fuel cells 22 is generated.

Figure 4:
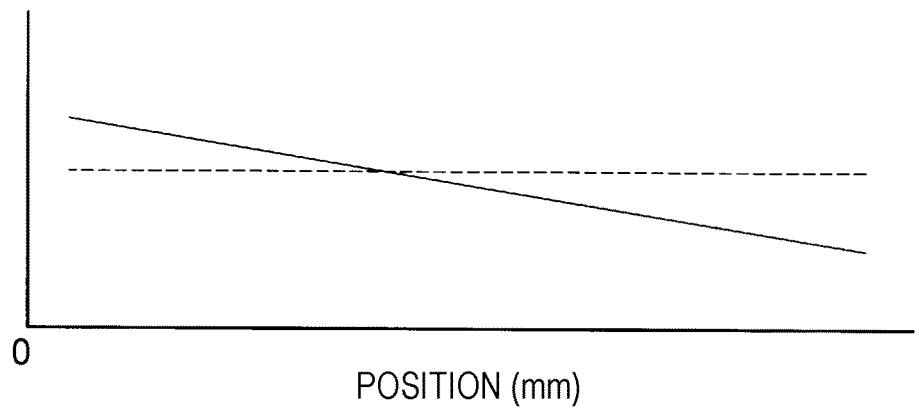
FIG. 4 is a graph showing a relation between positions and a fastening load of fuel cells in FIG. 3.

FIG. 4 is a graph showing a relation between positions and a fastening load of the fuel cells 22 in FIG. 3. A vertical axis indicates a fastening load (kN), and a horizontal axis indicates respective positions (mm) from the front of the fuel cell stack 20. A broken line in FIG. 4 indicates a fastening load of the fuel cell stack 20 when no inertia force to the vehicle 100 is generated. As shown in FIG. 4, in the rear part of the fuel cell stack 20, a position where the stacking condition of the fuel cells 22 becomes looser has a smaller fastening load than a fastening load at a position where the stacking condition of the fuel cells 22 becomes tighter, in the front part of the fuel cell stack 20.

Figure 5:
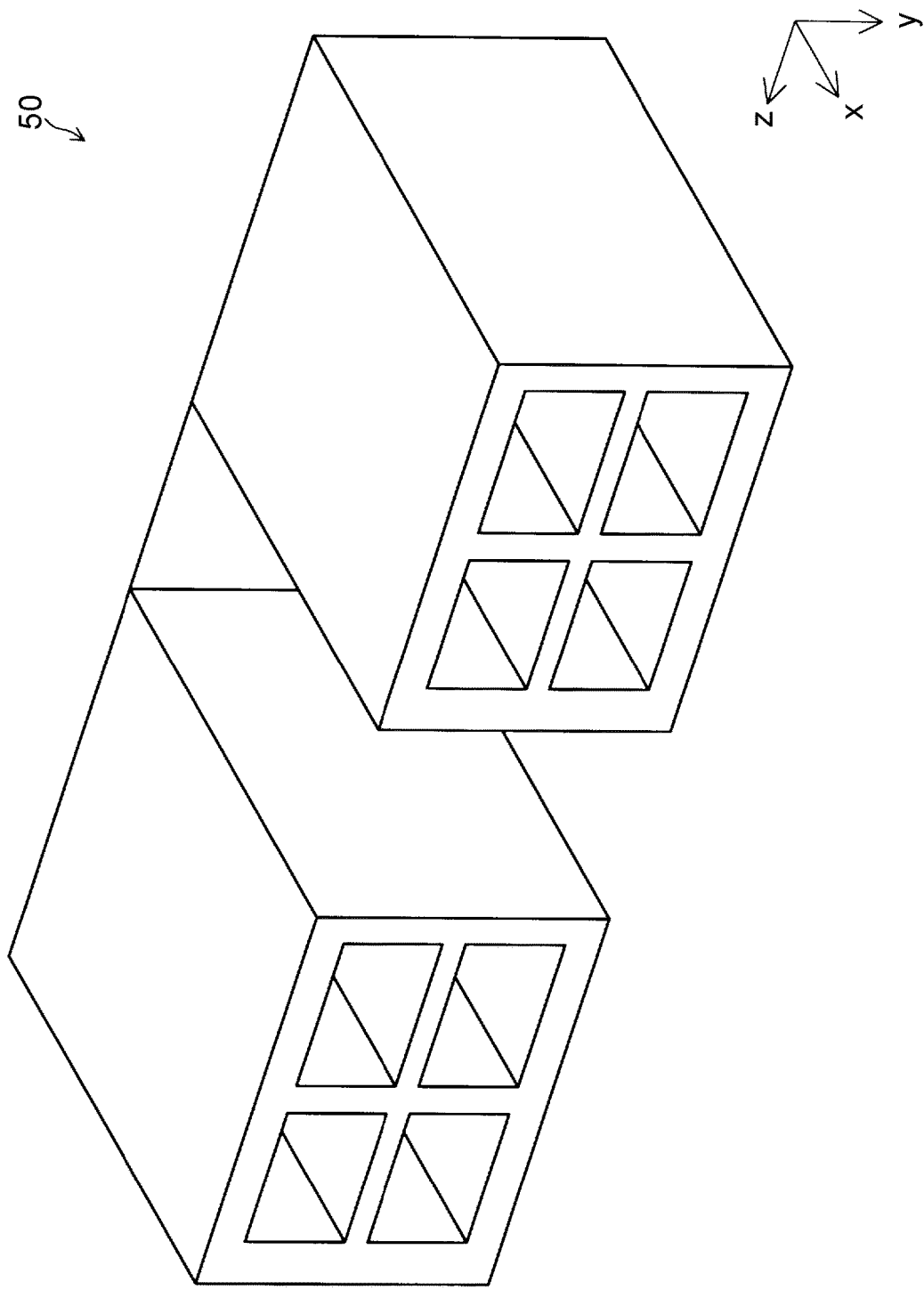
FIG. 5 is an explanatory view showing a schematic configuration of a buffer member.

FIG. 5 is an explanatory view showing a schematic configuration of the buffer member 50. In the present embodiment, the buffer member 50 is a crush box formed by extruding an aluminum alloy. In the present embodiment, the crush box is formed by forming a rectangular parallelepiped member with four rectangular-shaped through-holes extending along the vehicle-longitudinal direction (the x-axis direction). In the present embodiment, the buffer member 50 is composed of two crush boxes arranged in the vehicle-width direction (the z-axis direction). The buffer member 50 may be formed by metal other than an aluminum alloy, or resin. When a load is applied in the axial direction (the x-axis direction) of the vehicle 100 at the time of a front collision of the vehicle 100, the buffer member 50 repetitively buckles in the axial direction, to be plastically deformed into a bellows shape (in an accordion-like shape) so as to absorb the collision load.

In this embodiment, the buffer member 50 configured to absorb a collision load in such a manner that an input load inputted into the fuel cell stack 20 at the front collision time is reduced so as to be smaller than a durable load of the fuel cell stack 20 at the front collision time. The collision load to be absorbed by the buffer member 50 can be adjusted by the number, longitudinal lengths, the material of the crush boxes, and others. The durable load of the fuel cell stack 20 at the front collision time denotes a maximum load by which no coolant and no reaction gas are brought to leak out even when an inertia force is generated in the fuel cell stack 20 at the front collision time. The durable load of the fuel cell stack 20 in the present embodiment is 200 kN, for example.

The "front collision" in the present embodiment denotes a collision of the vehicle 100 toward a vehicle frontward direction at a predetermined speed. In the present embodiment, the predetermined speed denotes a test speed recommenced by health organizations of various nations, and such a recommended speed is referred to as a rating speed. In the present embodiment, in compliance with a recommended speed in the IIHS (Insurance Institute for Highway Safety) of the United States, the rating speed is defined to be 56 km/h (35 miles/h). Note that the rating speed is not limited to the above one, and for example, the rating speed may be defined in compliance with the lows of various nations, such as Europe, China, and Japan, or recommended speeds of the health organizations of the governments. The rating speed is 55 km/h in Europe and China.

Figure 6:
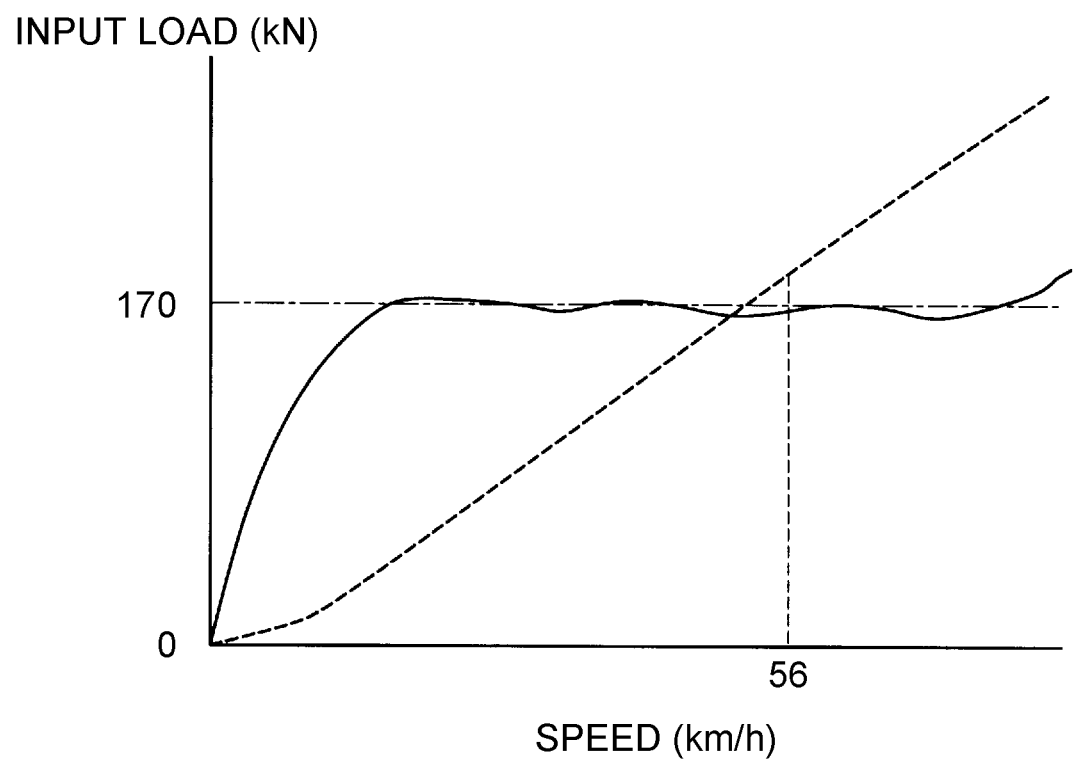
FIG. 6 is a graph showing a relation between a speed of the vehicle at a vehicle front collision time and an input load into the fuel cell stack.

FIG. 6 is a graph showing a relation between the speed of the vehicle 100 at the front collision time and the input load into the fuel cell stack 20. The vertical axis indicates an input load (kN), and the horizontal axis indicates a speed (km/h) at the front collision time of the vehicle 100. In FIG. 6, a solid line exemplifies an input load into the fuel cell stack 20 with the buffer member 50, and a broken line exemplifies an input load into the fuel cell stack 20 without the buffer member 50.

As indicated by the broken line, if no buffer member 50 is provided, the input load becomes greater in proportion to increase in speed of the vehicle. In this case, as shown in FIG. 3, in the fuel cell stack 20, variation in tightness-looseness is caused in the stacking condition of the fuel cell stack 20. In the present embodiment, as indicated by the solid line, the buffer member 50 is designed such that an input load into the fuel cell stack 20 is not more than a predetermined load, for example, approximately 170 kN, regardless of the speed at the front collision of the vehicle within a speed range of at least 0 to 56 km/h. The degree of this load can be defined by previously finding a value through experiments, the value by which the input load into the fuel cell stack 20 at the front collision time is smaller than the durable load of the fuel cell stack 20 at the front collision time.

In the present embodiment, the input load into the fuel cell stack 20 at the front collision time of the vehicle 100 can be found by adding an input load reduced by the buffer member 50 to an input load into the fuel cell stack 20 via the mounts 40, more specifically, an input load reduced by the front mount 40F and the rear mount 40R.

According to the vehicle 100 of the present embodiment, because the buffer member 50 is disposed in front of the fuel cell stack 20, the buffer member 50 absorbs an impact (a load) at the front collision time. In the present embodiment, it is configured to reduce the input load into the fuel cell stack 20 by the buffer member 50 at the front collision time so as to be smaller than the durable load of the fuel cell stack 20; therefore, it is possible to reduce an inertia force applied to the stacking direction of the fuel cell stack 20, to thereby suppress variation in tightness-looseness from being caused in the stacking condition of the fuel cell stack 20. Accordingly, it is possible to suppress the coolant and the reaction gas from being leaking out.

In the present embodiment, since the vehicle 100 includes the stack frame 30, it is possible to suppress an impact of the front collision from being applied to the stack frame 30, to thus suppress the impact from being directly applied onto the fuel cell stack 20. Accordingly, it is possible to suppress variation in tightness-looseness from being caused in the stacking condition of the fuel cell stack 20, to thereby more effectively suppress leakage of the coolant and the reaction gas.

In the present embodiment, because the vehicle 100 includes the mounts 40, it is possible to release an impact applied onto the stack frame 30 toward the mounts 40, to thereby distribute the impact at the front collision time. Accordingly, it is possible to suppress variation in tightness-looseness from being caused in the stacking condition of the fuel cell stack 20, to thereby more effectively suppress the coolant and the reaction gas from leaking out. In addition, it is possible to define an impact load to be absorbed by the buffer member 50 to be smaller, thus promoting enhancement of designing flexibility of the buffer member 50.

B. Variations

<First Variation>

In the embodiment, the buffer member 50 may be composed of a container containing a gel having an impact absorbing property thereinside, for example. The buffer member 50 may be formed by a rubber plate or a spring.

<Second Variation>

In the embodiment, the buffer member 50 is fixed to the front end of the stack frame 30. To the contrary, the buffer member 50 may be fixed to a front end of the fuel cell stack 20, more specifically, to a front end of the case 21. The vehicle 100 may not include the stack frame 30. More specifically, in the vehicle 100, the fuel cell stack 20 may be directly fixed to the mounts 40 or the suspension member 41.

<Third Variation>

In the embodiment, the vehicle 100 includes the mounts 40. To the contrary, the vehicle 100 may not include the mounts 40. More specifically, the fuel cell stack 20 or the stack frame 30 may be directly fixed to the suspension member 41. In this case, the input load into the fuel cell stack 20 at the front collision time of the vehicle 100 as indicated by the solid line in FIG. 6 becomes greater by a load reduced by the mounts 40.

The present disclosure is not limited to any of the embodiments and the variations, but may be embodied by various configurations without departing from the scope of the disclosure. For example, the technical features of the embodiments and variations corresponding to the technical features of the respective aspects described in "Summary" may be replaced or combined appropriately, in order to solve the problems or in order to achieve part or all of the advantageous effects. Any of the technical features may be omitted appropriately unless the technical feature is described as essential herein.

What is claimed is:

1. A vehicle comprising:
   a front room disposed at a front portion of the vehicle in the vehicle in a vehicle-longitudinal direction;
   a fuel cell stack disposed in the front room, the fuel cell stack comprising multiple cells stacked in the vehicle-longitudinal direction inside of a fuel cell case; and
   a buffer member disposed in front of the fuel cell case and a stack frame in the vehicle-longitudinal direction;
   wherein the stack frame supports the fuel cell stack from a bottom of the fuel cell stack, and the buffer member is fixed to a front end of the stack frame and supported by the stack frame.

2. The vehicle according to claim 1, wherein
   the buffer member is configured to reduce an input load into the fuel cell stack at a front collision time of the vehicle at a predetermined rating speed to be smaller than a durable load of the fuel cell stack at the front collision time of the vehicle at the predetermined rating speed.

3. The vehicle according to claim 2, wherein
   the predetermined rating speed is 56 km/h.

4. The vehicle according to claim 1, further comprising a mount fixing the stack frame to the vehicle.

5. The vehicle according to claim 1, wherein
   the vehicle is a fuel cell vehicle.

6. The vehicle according to claim 1, wherein the buffer member is selected from the group consisting of a crush box, a container containing impact absorbing gel, a rubber plate, and a spring.

7. The vehicle according to claim 1, further comprising a radiator disposed at a frontward position in the front room in the vehicle longitudinal direction, and wherein the buffer is disposed between the radiator and the fuel cell case.

8. A vehicle comprising:
a front room disposed at a front portion of the vehicle in the vehicle in a vehicle-longitudinal direction;
a fuel cell stack disposed in the front room, the fuel cell stack comprising multiple cells stacked in the vehicle-longitudinal direction inside of a fuel cell case; and
a buffer member disposed in front of the fuel cell case and a stack frame in the vehicle-longitudinal direction;
wherein the buffer member is fixed to a front end of the stack frame and supported by the stack frame.

9. The vehicle according to claim 8, wherein
the buffer member is configured to reduce an input load into the fuel cell stack at a front collision time of the vehicle at a predetermined rating speed to be smaller than a durable load of the fuel cell stack at the front collision time of the vehicle at the predetermined rating speed.

10. The vehicle according to claim 9, wherein
the predetermined rating speed is 56 km/h.

11. The vehicle according to claim 8, wherein
the vehicle is a fuel cell vehicle.

12. The vehicle according to claim 8, wherein the buffer member is selected from the group consisting of a crush box, a container containing impact absorbing gel, a rubber plate, and a spring.

* * * * *